(12) United States Patent
He et al.

(10) Patent No.: US 6,359,658 B1
(45) Date of Patent: Mar. 19, 2002

(54) SUBJECTIVE NOISE MEASUREMENT ON ACTIVE VIDEO SIGNAL

(75) Inventors: Haiyan He, Wappingers Falls, NY (US); Christian Hentschel, Eindhoven (NL)

(73) Assignee: Philips Electronics North America Corporation, New York, NY (US)

( * ) Notice: Subject to any disclaimer, the term of this patent is extended or adjusted under 35 U.S.C. 154(b) by 0 days.

(21) Appl. No.: 09/519,548

(22) Filed: Mar. 6, 2000

(51) Int. Cl.$^7$ ................................................. H04N 5/21
(52) U.S. Cl. ........................ 348/607; 348/180; 348/618; 348/622; 324/613
(58) Field of Search ................................ 348/180, 192, 348/607, 618, 619, 622; 324/119, 613, 614, 628, 76.29, 76.24

(56) References Cited

U.S. PATENT DOCUMENTS

| | | | | |
|---|---|---|---|---|
| 4,684,989 A | * | 8/1987 | Roeder et al. | 348/607 |
| 4,779,131 A | * | 10/1988 | Matsumoto et al. | 348/699 |
| 5,294,979 A | * | 3/1994 | Patel et al. | 348/624 |
| 5,394,192 A | * | 2/1995 | Hackett | 348/619 |
| 5,490,094 A | * | 2/1996 | Heimburger et al. | 348/607 |
| 5,657,401 A | * | 8/1997 | De Haan et al. | 382/275 |
| 6,169,583 B1 | * | 1/2001 | Merkl et al. | 348/607 |

OTHER PUBLICATIONS

"Visual Thresholds for Wave Quantization Error", by Andrew Watson et al., Paper No. 44, vol. 2657, The SPIE Proceedings, Human Vision and Electronic Imaging Society for Imaging Science and Technology, 1996.

* cited by examiner

Primary Examiner—Michael Lee
Assistant Examiner—Trang U. Tran
(74) Attorney, Agent, or Firm—Laurie E. Gathman (57) ABSTRACT

An apparatus and method is disclosed for measuring and filtering noise signals in an active video signal to create an enhanced video signal that produces a video image that is subjectively perceived to be superior to prior art video images. The apparatus of the invention comprises (1) a filter for filtering frequency components of a video signal, and (2) an absolute value unit for calculating the absolute value of pixels in the filtered video signal, and (3) a clipping unit for clipping the absolute values of the pixels to a threshold value related to subjective human perception abilities, and (4) a summer circuit for summing the values of the clipped signals for pixels that are located within a sliding window, where the sliding window is sequentially located in different areas of a frame of the video image, and (5) a detector for detecting at least one minimum sum of the clipped absolute values of the pixels that is indicative of the noise in the video signal of the video image. The apparatus and method provide ratios of video signal to noise that permit the creation of subjectively superior video images. The apparatus and method also measure blocking artifacts in the video signal.

25 Claims, 3 Drawing Sheets

SUBJECTIVE NOISE MEASUREMENT ON ACTIVE VIDEO SIGNAL

TECHNICAL FIELD OF THE INVENTION

The present invention is directed to an apparatus and method for enhancing a video signal and, more specifically, to an apparatus and method for measuring and filtering noise signals in an active video signal to create an enhanced video signal that produces a video image that is subjectively perceived to be superior to prior art video images.

BACKGROUND OF THE INVENTION

Video signal image enhancement circuitry in current television sets provides image enhancement by using noise measurement algorithms to measure and filter out noise signals. In the world of analog signals, the most common type of noise is Gaussian noise. Therefore, most prior art noise measurement algorithms are designed to measure and filter out only Gaussian noise.

Because noise on the video signal may arise from more than one source, noise that is detected in the video signal may be composed of more than one component. Each noise signal component may have its own characteristics. This is true even for noise signal components that are of the same type. For example, even if all the noise signal components in a video signal are of the Gaussian noise type, the frequency characteristics of each Gaussian noise signal component will differ from the frequency characteristics of each of the other Gaussian noise signal components.

With the level of digital transmissions in the environment continually increasing, digital transmission MPEG artifacts are more commonly appearing in video signals. To maintain high quality video signals, it is desirable to eliminate the effect of the MPEG artifacts upon the video signals. Because the existing noise measurement algorithms in current television sets can only measure Gaussian noise, it is necessary to add a separate MPEG artifact detector to the television set circuitry to detect, measure and eliminate MPEG artifacts from the video signal.

It would be desirable to have an apparatus and method that is capable of detecting more than one Gaussian noise signal component in a video signal. In addition, it would be desirable if the apparatus and method is also capable of detecting MPEG artifact noise signal components in a video signal.

To reduce noise in a video signal the noise level in the video signal must be identified and then subtracted from the video signal. A number of prior art techniques exist for identifying the noise level in a video signal. For example, a simple measure of the root-mean-square ("rms") noise in a video signal may be obtained from the following equation:

$$N_{estimated} = \sqrt{\sum_i \{(s[i] + n[i]) - s[i]\}^2} \qquad (1)$$

In Equation (1), $N_{estimated}$ is the estimated noise, $s[i]$ is the signal without noise in the $i_{th}$ interval, and $n[i]$ is the noise is the $i_{th}$ interval. Because the received signal is $(s[i]+n[i])$, the measurement of $N_{estimated}$ can only be obtained when $s[i]$ is known. This suggests the possibility of measuring the noise in the horizontal blanking intervals (or the vertical blanking intervals) of the video signal where $s[i]$ is known to be equal to a blanking level $V_{bl}$. Although the blanking level $V_{bl}$ is not known exactly, it can be estimated as the long term average of $(s[i]+n[i])$ in the blanking interval.

Unfortunately, the estimate of the noise level in the blanking interval is not a reliable estimate of the noise level in the active video signal. This is because blanking signals are frequently reinserted by videocassette recorders and signal repeater stations in order to minimize clamp noise and sync jitter. That is, new blanking signals with less noise are inserted in place of the old blanking signals that may have more noise. The noise in the newly inserted blanking signals may therefore be less than the noise actually contained in the active video signal. Equating the noise level in the newly inserted blanking signals with the noise level in the active video signal would result in an underestimation of the actual noise level in the active video signal.

For this reason it is necessary to measure the noise level in the active video signal portion of the video signal. This introduces the problem of distinguishing between the signal and the noise in the active video signal. One approach for addressing this problem has been to assume that the image contains a certain minimum amount of horizontal stretches of constant luminance. In each of these stretches of L pixels having constant luminance (or almost constant luminance), it is assumed that variations within these stretches of pixels are caused by noise. It is possible to estimate the level of these local noise signals by determining the variance as follows:

$$N_{estimated} = (x, y, f) = \sum_{j=x}^{x+L-1} (F[j, y, f] - F_{x,y,f})^2 \qquad (2)$$

In Equation (2), a pixel position is specified by the coordinates (x,y,f). For a particular pixel, the value "x" specifies the position of the pixel in a line, the value "y" specifies the position of the line in a frame, and the value "f" specifies the position of the frame. During a broadcast the pixels are transmitted sequentially. Therefore, the location of any particular pixel during a transmission may be specified by a single (i.e., one dimensional) coordinate. The single coordinate is referred to as "i" and the value of "i" is calculated by:

$$i = x \cdot T_x + y \cdot T_L + f \cdot T_f \qquad (3)$$

In Equation (3), $T_x$ is the sample time, $T_L$ is the line duration and $T_f$ is the field duration. The values for $T_x$, $T_L$ and $T_f$ are fixed for a particular standard (e.g., PAL, NTSC). The location of a pixel in a transmission may be specified using this method.

In Equation (2), $N_{estimated}$ (x,y,f) is the estimated noise, L is the number of pixels in a selected stretch of pixels, and F[x,y,f] is equal to (Y[i]+n[i]). Y[i] is the luminance in the $i_{th}$ interval and n[i] is the noise is the $i_{th}$ interval. In Equation(2), $F_{x,y,f}$ is the local average of the (Y[i]+n[i]) signal and is calculated by:

$$F_{x,y,f} = \frac{1}{L} \sum_{k=x}^{x+L-1} F[k, y, f] \qquad (4)$$

To utilize the variance method to estimate the noise level in an active video signal it is necessary to calculate the variance from a large number of areas. It is assumed that the image contains a certain amount of small areas of constant luminance. It is also assumed that the areas yielding the smallest variance contain no detail from the image but only noise. The problem is that if the image contains a lot of "flat" area (where there is no contrast or very little contrast in the image), the variance method leads to an underestimation of the noise. This makes the noise measurement dependent upon the picture content.

One method for solving this problem is to take the average of the noise estimates over the R smallest noise estimates where R is a preselected number that is a non-zero positive integer. The averaging of the noise estimates decreases the dependency of the noise measurement upon the picture content.

After a noise measurement system estimates the amount of noise in a video signal, the noise measurement system sends the noise estimate to other signal processing elements of the video system. One such signal processing element is a noise subtraction element that is capable of subtracting the noise components of the signal from the active video signal. The subtraction of the noise components from the active video signal provides an enhanced active video signal that is capable of producing improved video images with less noise content.

The presence in a video signal of noise components having differing frequency characteristics may cause a noise measurement system (and its associated noise subtraction element) to make corrections to the video signal that do not provide the highest quality image possible from the viewpoint of subjective perception. The subjective perception of viewers of the video image that is provided by the corrected video signal may not always be as good as one would expect based on the corrections applied by a noise measurement system. This is because presently existing noise measurement methods are not designed to remove noise from video signals in a manner that would optimize the resulting video images for presentation to the human eye.

Therefore, there is a need for noise measurement apparatuses and methods that are capable of measuring and filtering noise signals in video signals in a manner that takes into account the properties of the human eye. In a particular, there is a need for noise measurement apparatuses and methods that are capable of measuring and filtering noise signals in video signals in a manner that provides an enhanced video image that is subjectively perceivable by human viewers as having image qualities that are superior compared to the image qualities of video images produced with prior art noise measurement algorithms. More particularly, there is a need for a noise measurement apparatuses and methods that are capable of determining whether noise in a video signal is sufficiently large to be noticed by the human eye.

SUMMARY OF THE INVENTION

The present invention generally comprises an apparatus and method for measuring and filtering noise signals in an active video signal in a manner that takes into account the properties of the human visual system that are used to view video images.

In an advantageous embodiment of the invention, the apparatus of the invention comprises (1) a filter that is capable of selecting a range of frequency components of a video signal to form a filtered video signal, and (2) an absolute value unit that is capable of forming a signal that represents the absolute value of the luminance of pixels in the filtered video signal, and (3) a clipping unit that is capable of clipping the signal that represents the absolute value of the luminance of the pixels to a clipping threshold value related to subjective human perception abilities, and (4) a summer circuit that is capable of summing the values of the clipped signals for pixels that are located within a sliding window, wherein the summer circuit is capable of obtaining a plurality of the sums of the values as the sliding window is sequentially located in different areas of a frame of the video image, and (5) a detector that is capable of detecting at least one sum of the values that is a minimum value of the plurality of the sums of the values, to obtain a signal that is indicative of the noise in the video signal of the video image.

It is a primary object of the present invention to provide a noise measurement apparatus and that is capable of measuring and filtering noise signals in video signals in a manner that takes into account the properties of the human visual system that are used to view video images.

It is a further object of the present invention to provide a noise measurement apparatus and method that is capable of measuring and filtering noise signals in active video signals in a manner that provides an enhanced video image that is subjectively perceivable by human viewers as having image qualities that are superior compared to the image qualities of video images produced with prior art noise measurement apparatus and methods.

The foregoing has outlined rather broadly the features and technical advantages of the present invention so that those skilled in the art may better understand the Detailed Description of the Invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the Detailed Description of the Invention, it may be advantageous to set forth definitions of certain words and phrases used throughout this patent document: the terms "include" and "comprise" and derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller," "processor," or "apparatus" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OF THE INVENTION

Figure 1:
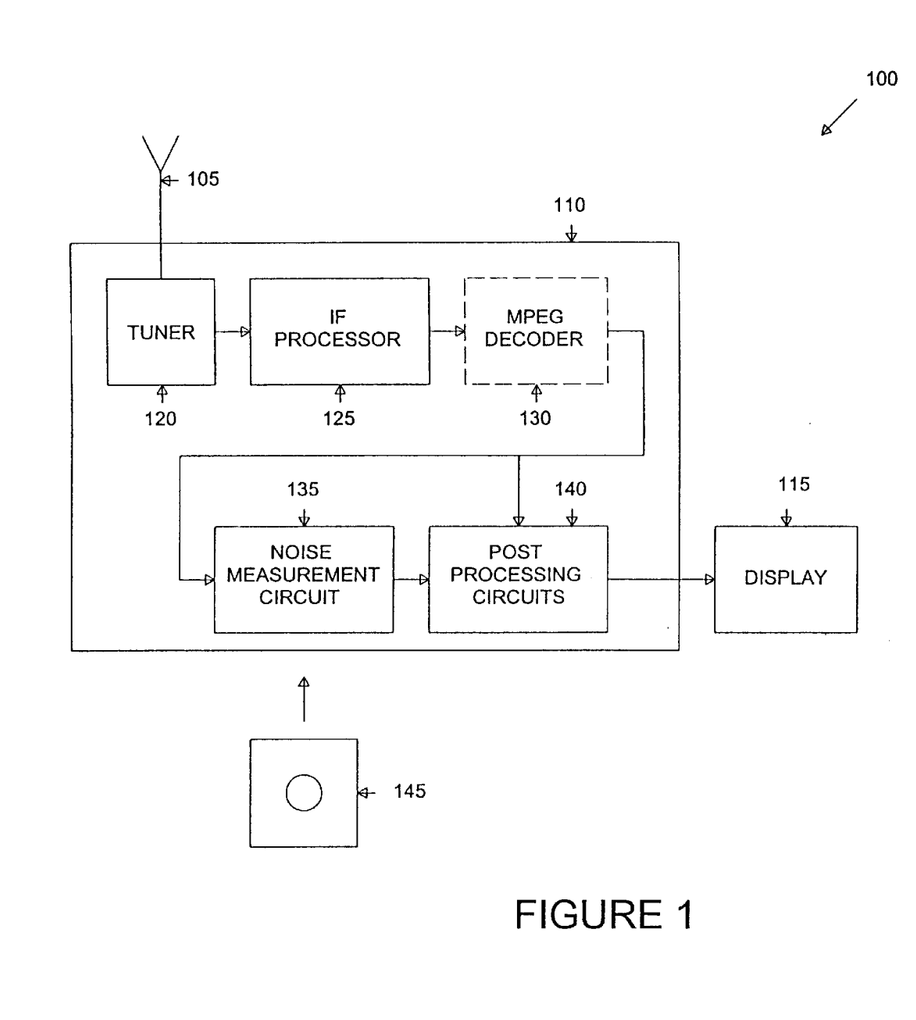
FIG. 1 is a block diagram of a television set that utilizes the apparatus and method of the present invention.
Figure 2:
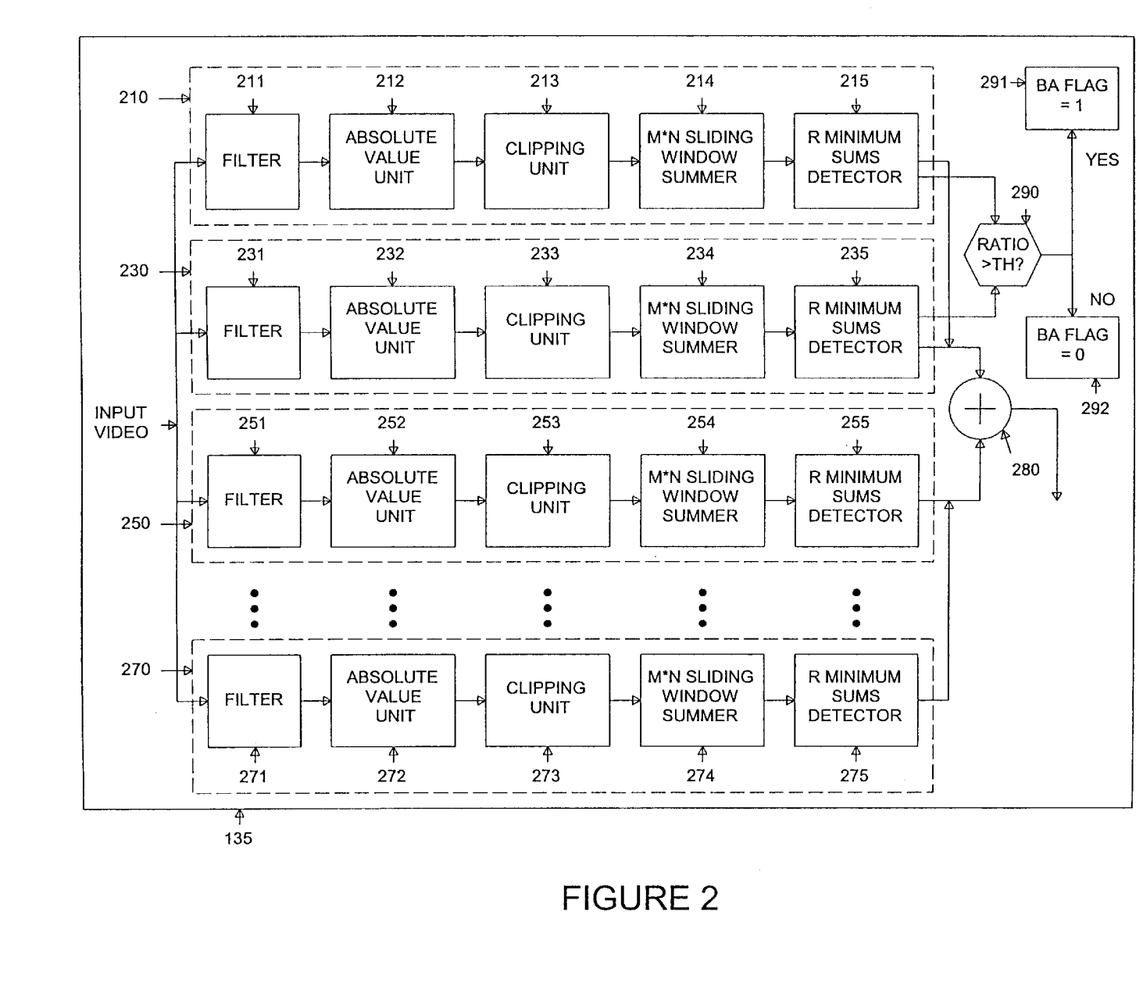
FIG. 2 is a block diagram illustrating the apparatus and method of the present invention.
Figure 3:
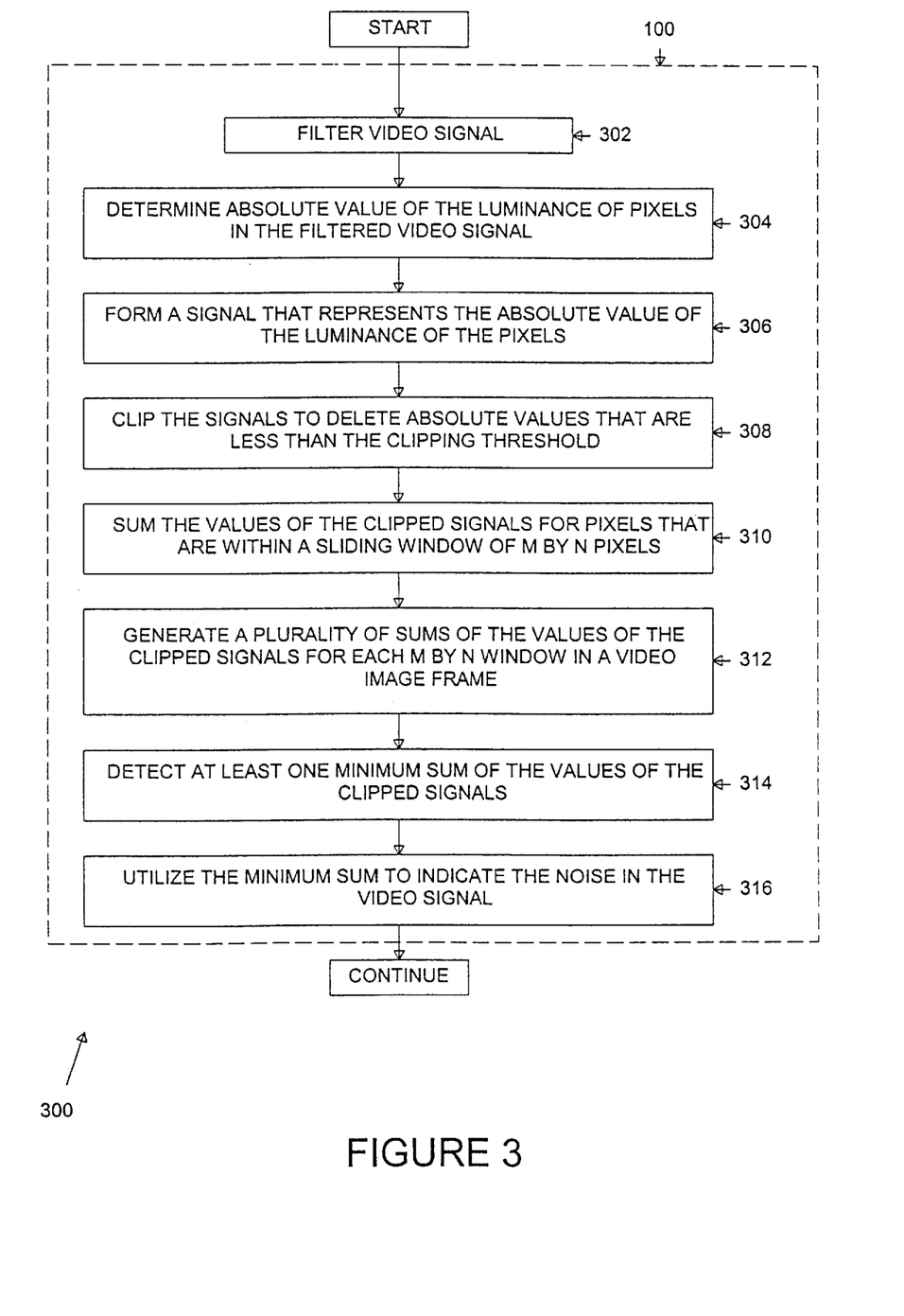
FIG. 3 is a flow diagram illustrating the method of operation of the apparatus of the present invention.

FIGS. 1 through 3, discussed below, and the various embodiments set forth in this patent document to describe the principles of the apparatus and method of the present invention are by way of illustration only and should not be construed in any way to limit the scope of the invention. The apparatus and method of the present invention will be described as an apparatus and method for enhancing a video signal in a television set. It is important to realize that the apparatus and method of the present invention is not limited to television sets. Those skilled in the art will readily understand that the principles of the present invention may also be successfully applied in any type of video signal system, including, without limitation, television receivers, television cameras, computer video display systems, and any type of electronic equipment that utilizes or processes video signals. In the descriptions that follow, a television set is employed for illustration purposes only.

FIG. 1 is a block diagram of a television set 100 that utilizes the apparatus and method of the present invention. Television set 100 comprises television receiver 110 and display unit 115. Display unit 115 may be a cathode ray tube or a flat panel display or any type of equipment for displaying video images. Television receiver 110 comprises antenna 105 for receiving television signals. Antenna 105 is coupled to tuner 120. Tuner 120 is coupled to intermediate frequency ("IF") processor 125. IF processor 125 is coupled to optional MPEG decoder 130. The output of MPEG decoder 130 is coupled to the noise measurement circuit 135 of the present invention. The output of MPEG decoder 130 is also coupled to post processing circuits 140. Noise measurement circuit 135 receives the same video signal that is input to post processing circuits 140. The output of post processing circuits 140 is input to display unit 115. MPEG decoder 130 is "optional" because television receiver 110 may be an analog television receiver that does not contain an MPEG decoder. In such an embodiment, the output of IF processor 125 is used by noise measurement circuit 135 and post processing circuits 140 instead of the output of MPEG decoder 130.

Noise measurement circuit 135 processes the video signals that it receives from MPEG decoder 130 to measure and filter the noise signals that are present in the video signals. As will be explained more fully below, noise measurement circuit 135 processes the video signals in a manner that takes into account the properties of human perception. The output of noise measurement circuit 135 is a signal to noise ratio for the video signals that noise measurement circuit 135 receives from MPEG decoder 130. The signal to noise ratio that is determined by noise measurement circuit 135 provides a subjectively more accurate and visually distinct video image than that provided by prior art noise measurement circuits. Noise measurement circuit 135 transfers the signal to noise ratio information to post processing circuits 140. Post processing circuits 140 are capable of utilizing the signal to noise ratio information to remove the noise signals from the video signals and thereby enhance the quality of video images produced by the video signals.

Post processing circuits 140 are capable of carrying out several different types of video signal processing. For example, some of the video signal processing applications include (a) noise level adaptive noise reduction algorithms, (b) noise level adaptive sharpness enhancement, (c) noise level adaptive luminance-chrominance separation, d) noise level adaptive motion detection, (e) noise level adaptive motion estimation and compensation, (f) noise level adaptive up-conversion, (g) noise level adaptive feature enhancement, and (h) noise level adaptive object based algorithms. It should be noted that the apparatus and method of the invention may also be utilized in image preprocessing circuits such as television cameras (not shown) for noise level adaptive filtering before MPEG encoding.

A schematic representation of computer diskette 145 is also shown in FIG. 1. In an alternate advantageous embodiment of the present invention, computer diskette 145 may be inserted into a computer disk drive (not shown) in television receiver 100. The computer disk drive is capable of receiving noise measurement information directly from noise measurement circuit 135 (or indirectly from post processing circuits 140) and writing the information to computer diskette 145.

In another alternate advantageous embodiment of the present invention, computer diskette 145 contains computer executable method steps for implementing the method of the present invention. In this advantageous embodiment, computer diskette 145 may be considered as a representation of any type of medium that is capable of storing and sending computerized data and instructions (including the Internet). In this embodiment of the invention, post processing circuits 140 are capable of receiving the computerized method steps of the invention from computer diskette 145 (or from any other type of medium for storing and sending computerized data and instructions). Post processing circuits 140 are capable of measuring the noise of the video signals from MPEG decoder 130 in accordance with the computerized method steps of the invention.

FIG. 2 is a block diagram illustrating the apparatus and method of noise measurement circuit 135 according to one embodiment of the present invention. An input video signal line is connected to each of signal processing branches 210, 230, 250 and 270. Any video signal that is input on the input signal line is simultaneously transferred to the first element of each of the signal processing branches. Although four exemplary signal processing branches are shown in FIG. 2, the invention is not limited to the use of four signal processing branches. Although the invention may be practiced with one signal processing branch, better results are obtained when at least two signal processing branches are used. There is no upper limit for how many signal processing branches may be used. This is indicated in FIG. 2 by the ellipses between signal processing branch 250 and signal processing branch 270.

The first element of signal processing branch 210 is signal filter 211. Filter 211 is a high-pass or band-pass filter for selecting and passing a specified range of frequency components of the video signal. The output of filter 211 is connected to the input of the second element of signal processing branch 210. The second element of signal processing branch 210 is absolute value unit 212. Absolute value unit 212 calculates the absolute values of the luminance of the pixels of the video signal that has been filtered by filter 211. Absolute value unit 212 also forms a signal that represents the absolute value of the luminance of the pixels in the filtered video signal.

The output of absolute value unit 212 is connected to the input of the third element of signal processing branch 210. The third element of signal processing branch 210 is clipping unit 213. Clipping unit 213 clips the amplitude of the signal that represents the absolute value of the luminance of the pixels of the video signal that has been filtered by filter 211. The amount of clipping is determined by a pre-selected clipping threshold level. The selection of the appropriate clipping threshold level for clipping unit 213 will be described more fully below.

The output of clipping unit 213 is connected to the input of the fourth element of signal processing branch 210. The fourth element of signal processing branch 210 is summer circuit 214 for summing the values of the clipped signals that represent the absolute values of the luminance of the pixels that are located within a frame or "window." In an advantageous embodiment the window is a rectangle with dimensions of M pixels by N pixels (referred to as an "M by N window"). However, other shapes for the window are possible (such as diamond shapes or cross shapes). For purposes of illustration the window will be assumed to be a rectangular M by N window. Summer circuit 214 adds the values of the clipped signals for the pixels that are located in the M by N window. Summer circuit 214 then stores that sum for later analysis.

The M by N window is movable over the frame that contains the video image. Therefore, it is sometimes referred to as the "M by N sliding window." Summer circuit 214 moves the M by N sliding window to a new location and adds the values of the clipped signals that represent the absolute values of the luminance of each of the pixels that are in the new location of the M by N window. Summer circuit 214 then stores the sum from the new location in the previously mentioned memory storage device.

Summer circuit 214 continues to move the M by N window over the frame that contains the video image and continues to add the values of the clipped signals for the pixels within the M by N window at each location. When summer circuit 214 has completed this process for the entire frame that contains the video image, then summer circuit 214 has obtained a complete set of sums of the values of the clipped signals for the pixels within each of the M by N window locations. This complete set of the sums of the values of the clipped signals is the output of summer circuit 214.

The output of summer circuit 214 is connected to the input of the fifth element of signal processing branch 210. The fifth element of signal processing branch 210 is detector 215 for detecting the R minimum sums of the values of the clipped signals in the frame that contains the video image. That is, detector 215 searches through the complete set of the sums of the values of the clipped signals from summer circuit 214 and finds the R sums having the smallest values. The pre-selected number R that is set in detector 215 is a number that is a non-zero positive integer. The smallest value that the number R may have is the value of one.

If the number R is selected to have a value of one, then detector 215 detects the minimal value sum (i.e., the sum with the smallest value of all of the sums in the complete set of sums that detector 215 receives from summer circuit 214). If the number R is selected to have a value greater than one, then the R sums that are detected by detector 215 are averaged together to obtain an averaged value sum for the noise signal. Whether the single minimal value sum for the noise signal is used or whether an averaged value sum for the noise signal is used, the resulting value of the noise signal is used to obtain a signal to noise ratio for the video signal.

Therefore, the output of detector 215 is a signal to noise ratio for the video signals that noise measurement circuit 135 receives from MPEG decoder 130 after the video signals have been filtered by filter 211. The output of detector 215 is the output of signal processing branch 210. The output of detector 215 is an input to adder unit 280. Adder unit 280 is capable of receiving signals from the other detectors in the other signal processing branches. The output of adder unit 280 represents the sum of the signals from each of the signal processing branches that are contained within noise measurement circuit 135. The output of adder unit 280 is coupled to an input of post processing circuits 140.

A temporal low pass filter (not shown) may be used to improve the output quality of the noise estimation signal. The output of adder unit 280 is coupled directly to the temporal low pass filter which smoothes the noise estimation signal over time. This feature usually gives better results for the noise level adaptive signal processing. The low pass filtered noise estimation signal that is the output of temporal low pass filter is coupled to an input of post processing circuits 140.

Second signal processing branch 230, third signal processing branch 250 and fourth signal processing branch 270 operate on the same principles as first signal processing branch 210. However, the specific parameters of the various units of one signal processing branch may differ from those of one or more of the other signal processing branches. This feature permits the simultaneous measurement of more than one type of noise signal.

For example, first signal processing branch 210 may be designed to measure a Gaussian noise signal within a particular frequency range. Filter 211 and the other units in first signal processing branch 210 will have their parameters set to measure that particular Gaussian noise signal. At the same time, second signal processing branch 230 may be designed to measure a second Gaussian noise signal within a different frequency range. Filter 231 and the other units in second signal processing branch 230 will have their parameters set to measure that particular second Gaussian noise signal. At the same time the other signal processing branches, 250 and 270, may be designed to measure other types of noise signals such as MPEG noise signals. This feature permits more than one type of noise signal to be measured simultaneously by noise measurement circuit 135.

Turning now to a description of the individual units of noise measurement circuit 135, it is noted that filter 231 of signal processing branch 230, filter 251 of signal processing branch 250, and filter 271 of signal processing branch 270 are high-pass or band-pass filters for selecting and passing a specified range of frequency components of the video signal. Each filter 211, 231, 251 and 271 may be designed to select and pass the same range of frequencies. As previously mentioned, in the alternative, each filter 211, 231, 251 and 271 may be designed to select and pass a different range of frequencies.

The respective outputs of filters 211, 231, 251 and 271 are connected to the respective inputs of absolute value units 212, 232, 252 and 272. The absolute value units 212, 232, 252 and 272 calculate the absolute value of the pixels of the video signal that have been filtered by the respective filters 211, 231, 251 and 271. The absolute value units 212, 232, 252 and 272 each form a signal that represents the respective absolute values of the luminance of pixels in the respective filtered video signals.

Each absolute value unit 212, 232, 252 and 272 may be selected to use the same absolute value calculation algorithm. Alternatively, each absolute value unit 212, 232, 252 and 272 may be selected to use a different absolute value calculation algorithm. The selection of an absolute value calculation algorithm may depend upon the range of signal frequencies or the type of noise signal that is being processed by the particular signal processing branch.

The respective outputs of the absolute value units 212, 232, 252 and 272 are connected to the respective inputs of the clipping units 213, 233, 253 and 273. The clipping units 213, 233, 253 and 273 clip their respective signals that represent the absolute value of the luminance of the pixels of the video signal that have been calculated by the respective absolute value calculation units 212, 232, 252 and 272.

Each clipping unit 213, 233, 253 and 273 may be selected to use the same threshold value for clipping. Alternatively, each clipping unit 213, 233, 253 and 273 may be selected to use a different threshold value for clipping. The selection of a threshold value for clipping may depend upon the range of signal frequencies or the type of noise signal that is being processed by the particular signal processing branch.

The respective outputs of the clipping units 213, 233, 253 and 273 are connected to the respective inputs of the M by N sliding window summer circuits 214, 234, 254 and 274. Each of the M by N sliding window summer circuits 214, 234, 254 and 274 obtains its respective complete set of sums of the values of the clipped signals of the pixels within each of the M by N window locations in each respective video image frame. The respective M by N sliding window summer circuits 214, 234, 254 and 274 send their respective complete set of sums of the values of the clipped signals to their respective detectors 215, 235, 255, 275.

Each of the detectors 215, 235, 255, 275 is designed to detect a specified number of minimum sums of the values of the clipped signals in the video image frame that has been covered by its respective M by N sliding windows. The number R can be chosen to be the same number for all of the detectors 215, 235, 255 and 275. Alternatively, a different number R can be chosen for each of the detectors 215, 235, 255 and 275. The selection of a particular value for R may depend upon the range of signal frequencies or the type of noise signal that is being processed by the particular signal processing branch.

The respective outputs of detectors 215, 235, 255 and 275 are connected to adder unit 280. Adder unit 280 receives the signals from detectors 215, 235, 255 and 275 and combines them into a unified signal for output. The output of adder unit 280 represents the sum of the signals from each of the signal processing branches 210, 230, 250 and 270, that are contained within noise measurement circuit 135. The output of adder unit 280 is coupled to an input of post processing circuits 140.

The selection of the appropriate clipping threshold levels for clipping units 213, 233, 253 and 257 is based upon the principle that human eyes have different sensibilities for different spatial frequencies. There is a human perception threshold for each spatial frequency component. Consider, for example, the case of signal A and signal B where each signal has an equal amount of energy. Signal A has a flat spectrum. Signal B has a lowpassed narrowband spectrum. It is clear that although the two signals have the same energy, signal B is more noticeable than signal A.

If a noise signal having a particular spatial frequency is below the human perception threshold for that particular spatial frequency, then that noise signal can not be perceived by human viewers. The clipping function of the present invention is designed so that only noise signals that are humanly perceptible will be included in the analysis of the noise signals.

A mathematical model for calculating visual perception threshold versus spatial frequency has been proposed by Andrew B. Watson et al. in a paper entitled "Visual Thresholds for Wavelet Quantization Error." The paper is Paper No. 44 of Volume 2657 of the SPIE Proceedings, Human Vision and Electronic Imaging, The Society for Imaging Science and Technology, 1996. The Watson paper was directed toward the design of a "perceptually lossless" quantization matrix for Discrete Wavelet Transform based image compression.

The Watson paper presents a model that has a curve that relates perception threshold to spatial frequency. The curve is described by the following equation:

$$Y(x)=10\ \exp[0.466(\log(x)+0.40)^2-0.31] \quad (5)$$

In Equation (5), $Y(x)$ is the perception threshold and x is the spatial frequency. In one embodiment of the present invention, this model is used to obtain clipping thresholds for the clipping units (231, 233, 253, 273) of the present invention.

The clipping threshold for a particular individual clipping unit (e.g., clipping unit 231) is calculated by integrating the product of the perception threshold and the spatial spectrum response of the particular individual filter (e.g., filter 211).

In general, to calculate the clipping threshold for any signal processing branch, say the "$n^{th}$" branch, assume that the filter spatial spectrum response is given by $S_n(x)$. Then the clipping threshold, $Th_n$, for the "$n^{th}$" branch would be given by:

$$Th_n = \int Y(x) S_n(x) dx \quad (6)$$

Clipping the signals that represent the absolute value of the luminance of the pixels in a filtered video signal by using the clipping thresholds described above produces an improved video signal to noise ratio. The improved video signal to noise ratio permits the formation of video images that are subjectively perceived to be superior to video images that do not use clipping or clipping thresholds.

Noise measurement circuit 135 is capable of measuring noise in an MPEG decoded video signal. There are two distinct types of noise artifacts in MPEG decoded video signals. The first type of artifact is referred to as "mosquito" noise. Mosquito noise is a ringing noise around the sharp edges of images that results from attenuation of high frequency transform coefficients. The second type of artifact is referred to as a "blocking" artifact. A blocking artifact is a visually perceptible "block" or "tile" of pixels in a smooth area of the MPEG decoded video signal that occurs where smooth transitions are replaced by abrupt changes that are introduced by the quantization process. The size of the "block" or "tile" is the same as the block size used in the transform decoding. The size is typically eight by eight (8by 8) pixels.

The quality of MPEG decoded sequences is strongly related to the quality factor of the encoding process. If the quality factor is high, then the most numerous artifacts will be "mosquito" noise. If the quality factor is low, then the most numerous artifacts will be "blocking" artifacts.

The present invention is capable of detecting and measuring "blocking" artifacts. To detect and measure "blocking" artifacts, noise measurement circuit 135 calculates the ratio of the R minimum sums of the first signal processing branch 210 to the R minimum sums of the second signal processing branch 230. This ratio is a good indicator of the presence of "blocking" artifacts because the spatial frequencies of "blocking" artifacts fall mainly within the frequency range of first filter 211. That is, the frequency range of first filter 211 is chosen to include the most common spatial frequencies for "blocking" artifacts.

The ratio is compared with an experimentally determined "blocking" artifact threshold number. If the ratio is greater than the "blocking" artifact threshold number, then a determination is made that significant number of "blocking" artifacts are present in the signal. Noise measurement circuit 135 makes the comparison of the ratio and the "blocking" artifact threshold number in decision circuit 290. The output of detector 215 containing the value of the R minimum sums from first signal processing branch 210 is coupled to decision circuit 290. The output of detector 235 containing the value of the R minimum sums from second signal processing branch 230 is also coupled to decision circuit 290. Decision circuit 290 calculates the ratio by dividing the value of the R minimum sums from first signal processing circuit 210 by the value of the R minimum sums from the second signal processing circuit 230. The calculated ratio is then compared to the experimentally determined "blocking" artifact threshold number.

If the value of the ratio is greater than the "blocking" artifact threshold number, then a Block Artifact flag is set to the value of one in flag setting circuit 291. If the value of the ratio is less than the "blocking" artifact threshold number, then the Block Artifact flag is reset to the value of zero in flag setting circuit 292. The Block Artifact flag is referred to as the "BA FLAG" in FIG. 2. The status of the Block Artifact flag is continually provided to the post processing circuits 140 by signal lines (not shown) that connect flag setting circuit 291 and flag setting circuit 292 to post processing circuits 140. In this manner post processing circuits 140 are continually informed whether or not "blocking" artifacts are significantly present in the video signal.

With this arrangement it is theoretically possible that a video signal that was exclusively composed of very low frequencies could cause the Block Artifact flag to be set when, in fact, there were no significant numbers of "blocking" artifacts. Although this is theoretically possible, in reality it is very rare for such video signals to occur. Therefore, for almost all of the video signals that ever occur in practice, the Block Artifact flag will be correctly set.

FIG. 3 is a flow diagram illustrating the method of operation of the apparatus of the present invention. The method for measuring noise in a video signal that is capable of forming a video image is generally indicated by the number 300. The first step 302 is the step of filtering the video signal with a filter that is capable of selecting a range of frequency components of the video signal to form a filtered video signal. The second step 304 is the step of determining the absolute value of the luminance of pixels in the filtered video signal.

The third step 306 is the step of forming a signal that represents the absolute value of the luminance of the pixels in the filtered video signal. The fourth step 308 is the step of clipping the signal that represents the absolute value of the luminance of the pixels in the filtered video signal. The fifth step 310 is the step of summing the values of the clipped signals for pixels that are located within a sliding window having dimensions of M pixels by N pixels located in an area of a frame of said video image.

The sixth step 312 is the step of obtaining a plurality of the sums of the values of the clipped signals for pixels located within the sliding window as the sliding window is sequentially located in different areas of the frame of the video image. The seventh step 314 is the step of detecting at least one sum of the values of the clipped signals that is a minimum value of the plurality of sums of the values of the clipped signals.

The eighth step 316 is the step of utilizing at least one sum of the values of the clipped signals to indicate the noise in the video signal of the video image.

Although the present invention has been described in detail with respect to the illustrative example of a television set, those skilled in the art should understand that they can make various changes, substitutions and alterations herein without departing from the spirit and scope of the invention in its broadest form.

What is claimed is:

1. An apparatus for measuring noise in a video signal that is capable of forming a video image comprising:
   a filter that is capable of selecting a range of frequency components of said video signal to form a filtered video signal; and
   an absolute value unit coupled to said filter to receive said filtered video signal wherein said absolute value unit is capable of forming a signal that represents the absolute value of the luminance of pixels in said filtered video signal; and
   a clipping unit coupled to said absolute value unit to receive said signal that represents the absolute value of the luminance of said pixels wherein said clipping unit is capable of clipping the signal that represents the absolute value of the luminance of said pixels in said filtered video signal by deleting any portion of said signal that is less than a clipping threshold, wherein said clipping threshold is calculated by integrating a multiplicative product where one factor of said product is a perception threshold that is a function of spatial frequency and the other factor of said product is the spatial spectrum response of said filter;
   a summer circuit coupled to said clipping unit that is capable of summing the values of the clipped signals that represent the absolute values of the luminance of pixels in said filtered video signal for pixels that are located within a sliding window, wherein said summer circuit is capable of obtaining a plurality of said sums of said values of said clipped signals as said sliding window is sequentially located in different areas of a frame of said video image; and
   a detector coupled to said summer circuit that is capable of detecting at least one sum of said values of said clipped signals that is a minimum value of said plurality of sums of said values of said clipped signals, to obtain a signal that is indicative of the noise in said video signal of said video image.

2. The apparatus as claimed in claim 1 wherein said perception threshold that is a function of spatial frequency is calculated by:

$$y=10\ \exp[0.466(\log(f)+0.40)^2-0.31].$$

3. An apparatus as claimed in claim 1 wherein said detector is capable of detecting R sums of said values of said clipped signals that are the minimum R values of said plurality of sums of said values of said clipped signals, where R is a number that is a non-zero positive integer.

4. The apparatus as claimed in claim 1 wherein said filter is capable of selecting a range of frequency components of a video signal to measure a Gaussian noise signal.

5. The apparatus as claimed in claim 1 wherein said filter is capable of selecting a range of frequency components of a video signal to measure mosquito noise artifacts in an MPEG signal.

6. An apparatus for measuring noise in a video signal that is capable of forming a video image, wherein said apparatus is capable of measuring blocking artifacts in said video signal, comprising:
- a plurality of signal-processing branches, wherein each signal-processing branch comprises:
  - a filter that is capable of selecting a range of frequency components of said video signal to form a filtered video signal;
  - an absolute value unit coupled to said filter to receive said filtered video signal wherein said absolute value unit is capable of forming a signal that represents the absolute value of the luminance of pixels in said filtered video signal;
  - a clipping unit coupled to said absolute value unit to receive said signal that represents the absolute value of the luminance of said pixels wherein said clipping unit is capable of clipping the signal that represents the absolute value of the luminance of said pixels in said filtered video signal;
  - a summer circuit coupled to said clipping unit that is capable of summing the values of the clipped signals that represent the absolute values of the luminance of pixels in said filtered video signal for pixels that are located within a sliding window, wherein said summer circuit is capable of obtaining a plurality of said sums of said values of said clipped signals as said sliding window is sequentially located in different areas of a frame of said video image; and
  - a detector coupled to said summer circuit that is capable of detecting R sums of said values of said clipped signals that are the minimum R values of said plurality of sums of said values of said clipped signals, where R is a non-zero positive integer number, to obtain a signal that is indicative of the noise in said video signal of said video image;
- an apparatus that is capable of calculating the ratio of R minimum sums of said plurality of sums of said values from a first signal processing branch of said plurality of signal processing branches to the R minimum sums of said plurality of sums of said values from a second signal processing branch of said plurality of processing branches; and
- an apparatus that is capable of comparing said ratio to an experimentally determined blocking artifact threshold number to determine if a significant number of blocking artifacts are present in said video signal.

7. An apparatus as claimed in claim 6 wherein at least one of said plurality of signal processing branches is capable of measuring a Gaussian noise signal.

8. An apparatus as claimed in claim 6 wherein at least one of said plurality of signal processing branches is capable of measuring mosquito noise artifacts in an MPEG signal.

9. An apparatus as claimed in claim 6 wherein said experimentally determined blocking artifact threshold number is ten.

10. An apparatus for measuring noise in a video signal that is capable of forming a video image comprising a plurality of signal processing branches in which each signal processing branch that receives said video signal comprises:
- a filter that is capable of selecting a range of frequency components of said video signal to form a filtered video signal; and
- an absolute value unit coupled to said filter to receive said filtered video signal wherein said absolute value unit is capable of forming a signal that represents the absolute value of the luminance of pixels in said filtered video signal; and
- a clipping unit coupled to said absolute value unit to receive said signal that represents the absolute value of the luminance of said pixels wherein said clipping unit is capable of clipping the signal that represents the absolute value of the luminance of said pixels in said filtered video signal by deleting any portion of said signal that is less than a respective clipping threshold of each said clipping unit, wherein said respective clipping threshold is calculated by integrating a multiplicative product where one factor of said product is a perception threshold that is a function of spatial frequency and the other factor of said product is the spatial spectrum response of a respective filter of said each clipping unit;
- a summer circuit coupled to said clipping unit that is capable of summing the values of the clipped signals that represent the absolute values of the luminance of pixels in said filtered video signal for pixels that are located within a sliding window, wherein said summer circuit is capable of obtaining a plurality of said sums of said values of said clipped signals as said sliding window is sequentially located in different areas of a frame of said video image; and
- a detector coupled to said summer circuit that is capable of detecting R sums of said values of said clipped signals that are the minimum R values of said plurality of sums of said values of said clipped signals, where R is a non-zero positive integer number, to obtain a signal that is indicative of the noise in said video signal of said video image.

11. The apparatus as claimed in claim 10 wherein at least one of said perception thresholds that is a function of spatial frequency is calculated by:

$$y=10 \exp[0.466(\log(f)+0.40)^2-0.31].$$

12. A method for measuring noise in a video signal that is capable of forming a video image comprising the steps of:
- filtering said video signal with a filter that is capable of selecting a range of frequency components of said video signal to form a filtered video signal;
- determining the absolute value of the luminance of pixels in said filtered video signal;
- forming a signal that represents the absolute value of the luminance of said pixels in said filtered video signal;
- clipping said signal that represents the absolute value of the luminance of said pixels in said filtered video signal by deleting any portion of said signal that is less than a clipping threshold, wherein said clipping threshold is calculated by integrating a multiplicative product where one factor of said product is a perception threshold that is a function of spatial frequency and the other factor of said product is the spatial spectrum response of said filter;
- summing the values of clipped signals for pixels that are located within a sliding window located in an area of a frame of said video image;
- obtaining a plurality of said sums of said values of said clipped signals for pixels located within said sliding window as said sliding window is sequentially located in different areas of said frame of said video image; and
- detecting at least one sum of said values of said clipped signals that is a minimum value of said plurality of sums of said values of said clipped signals,
  - wherein said at least one sum of said values of said clipped signals is indicative of the noise in said video signal of said video image.

13. A method as claimed in claim 12 further comprising the steps of:
  detecting R sums of said values of said clipped signals that are the minimum R values of said plurality of sums of said values of said clipped signals, where R is a non-zero positive integer number; and
  averaging said R sums to obtain an average sum that is indicative of the noise in said video signal of said video image.

14. A method as claimed in claim 12 wherein said perception threshold that is a function of spatial frequency is calculated by:

$$y=10\ \exp[0.466(\log(f)+0.40)^2-0.31].$$

15. A method for using a plurality of signal processing branches to measure noise in a video signal that is capable of forming a video image comprising the steps of:
  filtering said video signal with a filter that is capable of selecting a range of frequency components of said video signal to form a filtered video signal in each of said plurality of signal processing branches;
  determining the absolute value of the luminance of pixels in said filtered video signal in each of said plurality of signal processing branches;
  forming a signal that represents the absolute value of the luminance of said pixels in said filtered video signal in each of said plurality of signal processing branches;
  clipping said signal that represents the absolute value of the luminance of said pixels in said filtered video signal in each of said plurality of signal processing branches;
  summing the values of clipped signals for pixels that are located within a sliding window located in an area of a frame of said video image in each of said plurality of signal processing branches;
  obtaining a plurality of said sums of said values of said clipped signals for pixels located within said sliding window as said sliding window is sequentially located in different areas of said frame of said video image in each of said plurality of signal processing branches;
  detecting R sums of said values of said clipped signals that are the minimum R values of said plurality of sums of said values of said clipped signals, where R is a non-zero positive integer number, in each of said plurality of signal processing branches;
  averaging said R sums to obtain an average sum that is indicative of the noise in said video signal of said video image in each of said plurality of signal processing branches; and
  adding the average sums from each of said plurality of signal processing branches to obtain a signal that is indicative of the noise in said video signal of said video image.

16. For use in a noise measurement system capable of measuring noise in a video signal, computer executable process steps, stored on a computer readable storage medium, for detecting and measuring noise in a video signal comprising:
  filtering said video signal with a filter that is capable of selecting a range of frequency components of said video signal to form a filtered video signal;
  determining the absolute value of the luminance of pixels in said filtered video signal;
  forming a signal that represents the absolute value of the luminance of said pixels in said filtered video signal;
  clipping said signal that represents the absolute value of the luminance of said pixels in said filtered video signal by deleting any portion of said signal that is less than a clipping threshold, wherein said clipping threshold is calculated by integrating a multiplicative product where one factor of said product is a perception threshold that is a function of spatial frequency and the other factor of said product is the spatial spectrum response of said filter;
  summing the values of clipped signals for pixels that are located within a sliding window located in an area of a frame of said video image;
  obtaining a plurality of said sums of said values of said clipped signals for pixels located within said sliding window as said sliding window is sequentially located in different areas of said frame of said video image; and
  detecting at least one sum of said values of said clipped signals that is a minimum value of said plurality of sums of said values of said clipped signals, wherein said at least one sum of said values of said clipped signals is indicative of the noise in said video signal of said video image.

17. The computer executable process steps, stored on a computer readable storage medium, as claimed in claim 16 further comprising the steps of:
  detecting R sums of said values of said clipped signals that are the minimum R values of said plurality of sums of said values of said clipped signals, where R is a non-zero positive integer number; and
  averaging said R sums to obtain an average sum that is indicative of the noise in said video signal of said video image.

18. The computer executable process steps, stored on a computer readable storage medium, as claimed in claim 16 wherein said perception threshold that is a function of spatial frequency is calculated by:

$$y=10\ \exp[0.466(\log(f)+0.40)^2-0.31].$$

19. For use in a noise measurement system capable of using a plurality of signal processing branches to measure noise in a video signal, computer executable process steps, stored on a computer readable storage medium, for detecting and measuring noise in a video signal comprising:
  filtering said video signal with a filter that is capable of selecting a range of frequency components of said video signal to form a filtered video signal in each of said plurality of signal processing branches;
  determining the absolute value of the luminance of pixels in said filtered video signal in each of said plurality of signal processing branches;
  forming a signal that represents the absolute value of the luminance of said pixels in said filtered video signal in each of said plurality of signal processing branches;
  clipping said signal that represents the absolute value of the luminance of said pixels in said filtered video signal in each of said plurality of signal processing branches;
  summing the values of clipped signals for pixels that are located within a sliding window located in an area of a frame of said video image in each of said plurality of signal processing branches;
  obtaining a plurality of said sums of said values of said clipped signals for pixels located within said sliding window as said sliding window is sequentially located in different areas of said frame of said video image in each of said plurality of signal processing branches;

detecting R sums of said values of said clipped signals that are the minimum R values of said plurality of sums of said values of said clipped signals, where R is a non-zero positive integer number, in each of said plurality of signal processing branches;

averaging said R sums to obtain an average sum that is indicative of the noise in said video signal of said video image in each of said plurality of signal processing branches; and adding the average sums from each of said plurality of signal processing branches to obtain a signal that is indicative of the noise in said video signal of said video image.

20. A television receiver comprising an apparatus for measuring noise in a video signal that is capable of forming a video image comprising:

a filter that is capable of selecting a range of frequency components of said video signal to form a filtered video signal; and an absolute value unit coupled to said filter to receive said filtered video signal wherein said absolute value unit is capable of forming a signal that represents the absolute value of the luminance of pixels in said filtered video signal; and a clipping unit coupled to said absolute value unit to receive said signal that represents the absolute value of the luminance of said pixels wherein said clipping unit is capable of clipping the signal that represents the absolute value of the luminance of said pixels in said filtered video signal by deleting any portion of said signal that is less than a clipping threshold, wherein said clipping threshold is calculated by integrating a multiplicative product where one factor of said product is a perception threshold that is a function of spatial frequency and the other factor of said product is the spatial spectrum response of said filter;

a summer circuit coupled to said clipping unit that is capable of summing the values of the clipped signals that represent the absolute values of the luminance of pixels in said filtered video signal for pixels that are located within a sliding window, wherein said summer circuit is capable of obtaining a plurality of said sums of said values of said clipped signals as said sliding window is sequentially located in different areas of a frame of said video image; and a detector coupled to said summer circuit that is capable of detecting at least one sum of said values of said clipped signals that is a minimum value of said plurality of sums of said values of said clipped signals, to obtain a signal that is indicative of the noise in said video signal of said video image.

21. A television receiver as claimed in claim 20 comprising an apparatus wherein said perception threshold that is a function of spatial frequency is calculated by:

$$y=10 \exp[0.466(\log(f)+0.40)^2-0.31].$$

22. A television receiver as claimed in claim 20 comprising an apparatus wherein said detector is capable of detecting R sums of said values of said clipped signals that are the minimum R values of said plurality of sums of said values of said clipped signals, where R is a number that is a non-zero positive integer.

23. A television receiver for measuring noise in a video signal that is capable of forming a video image, wherein said apparatus is capable of measuring blocking artifacts in said video signal, comprising:

a plurality of signal-processing branches in which each signal-processing branch that receives said video signal comprises:

a filter that is capable of selecting a range of frequency components of said video signal to form a filtered video signal;

an absolute value unit coupled to said filter to receive said filtered video signal wherein said absolute value unit is capable of forming a signal that represents the absolute value of the luminance of pixels in said filtered video signal;

a clipping unit coupled to said absolute value unit to receive said signal that represents the absolute value of the luminance of said pixels wherein said clipping unit is capable of clipping the signal that represents the absolute value of the luminance of said pixels in said filtered video signal;

a summer circuit coupled to said clipping unit that is capable of summing the values of the clipped signals that represent the absolute values of the luminance of pixels in said filtered video signal for pixels that are located within a sliding window, wherein said summer circuit is capable of obtaining a plurality of said sums of said values of said clipped signals as said sliding window is sequentially located in different areas of a frame of said video image; and a detector coupled to said summer circuit that is capable of detecting R sums of said values of said clipped signals that are the minimum R values of said plurality of sums of said values of said clipped signals, where R is a non-zero positive integer number, to obtain a signal that is indicative of the noise in said video signal of said video image;

an apparatus that is capable of calculating the ratio of R minimum sums of said plurality of sums of said values from a first signal processing branch of said plurality of signal processing branches to the R minimum sums of said plurality of sums of said values from a second signal processing branch of said plurality of processing branches; and an apparatus that is capable of comparing said ratio to an experimentally determined blocking artifact threshold number to determine if a significant number of blocking artifacts are present in said video signal.

24. A television receiver comprising an apparatus for measuring noise in a video signal that is capable of forming a video image comprising a plurality of signal-processing branches in which each signal-processing branch that receives said video signal comprises:

a filter that is capable of selecting a range of frequency components of said video signal to form a filtered video signal;

an absolute value unit coupled to said filter to receive said filtered video signal wherein said absolute value unit is capable of forming a signal that represents the absolute value of the luminance of pixels in said filtered video signal;

a clipping unit coupled to said absolute value unit to receive said signal that represents the absolute value of the luminance of said pixels, wherein said clipping unit is capable of clipping the signal that represents the absolute value of the luminance of said pixels in said filtered video signal by deleting any portion of said signal that is less than a respective clipping threshold of each said clipping unit, wherein said respective clipping threshold is calculated by integrating a multiplicative product where one factor of said product is a perception threshold that is a function of spatial frequency and the other factor of said product is the spatial spectrum response of a respective filter of each said clipping unit;

a summer circuit coupled to said clipping unit that is capable of summing the values of the clipped signals that represent the absolute values of the luminance of pixels in said filtered video signal for pixels that are located within a sliding window, wherein said summer circuit is capable of obtaining a plurality of said sums of said values of said clipped signals as said sliding window is sequentially located in different areas of a frame of said video image; and a detector coupled to said summer circuit that is capable of detecting R sums of said values of said clipped signals that are the minimum R values of said plurality of sums of said values of said clipped signals, where R is a non-zero positive integer number, to obtain a signal that is indicative of the noise in said video signal of said video image.

25. A television receiver as claimed in claim 24 comprising an apparatus wherein at least one of said perception thresholds that is a function of spatial frequency is calculated by:

$$y=10\ \exp[0.466(\log(f)+0.40)^2-0.31].$$

* * * * *